United States Patent
Mahers et al.

(10) Patent No.: US 7,106,889 B1
(45) Date of Patent: Sep. 12, 2006

(54) IMAGE ANALYSIS SYSTEMS AND DEVICES FOR USE THEREWITH

(75) Inventors: Eric Gordon Mahers, Wirral (GB); Stephen Cyril Joyce, South Wirral (GB); Shail Patel, Wirral (GB); Derwent Swaine, Cumnor (GB); Roger Fowler, Headley (GB)

(73) Assignee: Oxoid Limited, Basingstoke (GB)

( * ) Notice: Subject to any disclaimer, the term of this patent is extended or adjusted under 35 U.S.C. 154(b) by 0 days.

(21) Appl. No.: 09/462,341

(22) PCT Filed: Jul. 1, 1998

(86) PCT No.: PCT/GB98/01916

§ 371 (c)(1),
(2), (4) Date: Apr. 10, 2000

(87) PCT Pub. No.: WO99/02045

PCT Pub. Date: Jan. 21, 1999

(30) Foreign Application Priority Data

Jul. 9, 1997 (GB) .................. 9714347.3

(51) Int. Cl.
*G06K 9/00* (2006.01)
*G06K 9/20* (2006.01)
*C12Q 1/18* (2006.01)
*C12Q 1/20* (2006.01)
*C12M 3/00* (2006.01)

(52) U.S. Cl. ............... 382/128; 382/321; 435/32; 435/33; 435/287.2; 435/288.3; 435/288.7

(58) Field of Classification Search ............... 382/101, 382/113, 137, 141, 151, 183, 184, 128; 235/462.08, 235/462.03; 435/32, 33, 287.2, 288.3, 288.7
See application file for complete search history.

(56) References Cited

U.S. PATENT DOCUMENTS

| | | | | |
|---|---|---|---|---|
| 3,474,004 A | * | 10/1969 | Fink | 435/288.3 |
| 3,637,989 A | * | 1/1972 | Howard et al. | 235/383 |
| 3,757,299 A | * | 9/1973 | Perry | 382/128 |
| 4,090,920 A | * | 5/1978 | Studer, Jr. | 435/288.4 |
| 4,220,417 A | * | 9/1980 | Sprott et al. | 400/70 |
| 4,250,405 A | * | 2/1981 | Ashcroft et al. | 235/456 |
| 4,403,339 A | * | 9/1983 | Wevelsiep et al. | 382/289 |
| 4,416,995 A | * | 11/1983 | Amaral | 435/287.3 |
| 4,448,534 A | * | 5/1984 | Wertz et al. | 356/435 |
| 4,809,342 A | * | 2/1989 | Kappner | 382/142 |
| 4,965,725 A | * | 10/1990 | Rutenberg | 382/224 |
| 5,134,272 A | * | 7/1992 | Tsuchiya et al. | 235/462.08 |
| 5,290,701 A | * | 3/1994 | Wilkins | 435/287.3 |
| 5,397,709 A | * | 3/1995 | Berndt | 436/34 |
| 5,573,950 A | * | 11/1996 | Graessle et al. | 435/287.3 |
| 5,595,708 A | * | 1/1997 | Berndt | 422/82.06 |
| 5,639,632 A | * | 6/1997 | Ericsson et al. | 435/32 |
| 5,694,478 A | * | 12/1997 | Braier et al. | 382/133 |
| 5,733,721 A | * | 3/1998 | Hemstreet et al. | 435/6 |
| 5,734,723 A | * | 3/1998 | Windel et al. | 380/55 |
| 5,764,798 A | * | 6/1998 | Liu | 382/190 |

(Continued)

*Primary Examiner*—Bhavesh M. Mehta
*Assistant Examiner*—Utpal Shah
(74) *Attorney, Agent, or Firm*—Barnes & ThornburgLLP

(57) ABSTRACT

An image analysis system for automated reading of printed multi-character codes, for example on antibiotic susceptibility testing disks, makes use of an orientation means, for example an underline printed beneath the code, to bring the code or its image into canonical alignment with an optimum reading direction for the code. Automated reading of the codes on randomly-orientated AST disks is therefore possible.

15 Claims, 4 Drawing Sheets

U.S. PATENT DOCUMENTS

| | | | | |
|---|---|---|---|---|
| 5,766,553 | A | * | 6/1998 | Staples et al. .............. 422/102 |
| 5,784,162 | A | * | 7/1998 | Cabib et al. ................ 356/456 |
| 5,789,173 | A | * | 8/1998 | Peck et al. ..................... 435/6 |
| 5,798,514 | A | * | 8/1998 | Domanik ............... 235/462.03 |
| 5,916,812 | A | * | 6/1999 | Chen et al. ................... 436/18 |
| 5,991,028 | A | * | 11/1999 | Cabib et al. ................ 356/456 |
| 6,022,734 | A | * | 2/2000 | Wardlaw ................ 435/288.7 |
| 6,045,758 | A | * | 4/2000 | Staples et al. .............. 422/102 |
| 6,064,763 | A | * | 5/2000 | Maltsev ..................... 382/183 |
| 6,096,272 | A | * | 8/2000 | Clark et al. .................. 422/64 |
| 6,140,069 | A | * | 10/2000 | Wardlaw ..................... 435/32 |
| 6,319,668 | B1 | * | 11/2001 | Nova et al. ..................... 435/6 |
| 6,416,969 | B1 | * | 7/2002 | Matsumura et al. .......... 435/32 |

* cited by examiner

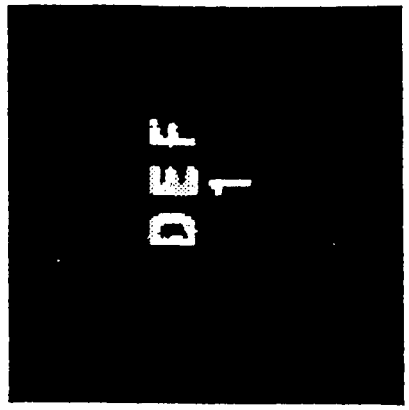
Fig. 3c
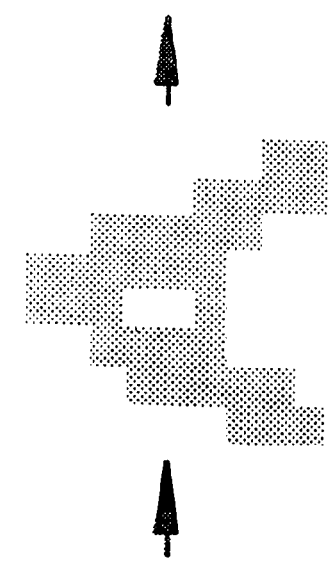
Fig. 2c
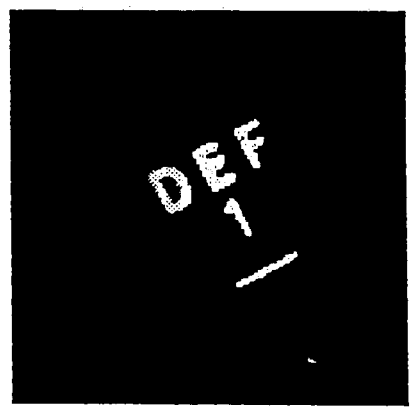
Fig. 3b
Fig. 2b
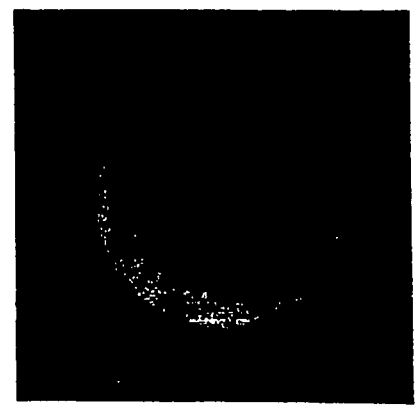
Fig. 3a
Fig. 2a

IMAGE ANALYSIS SYSTEMS AND DEVICES FOR USE THEREWITH

FIELD OF THE INVENTION

This invention relates to image analysis in the reading of information, such as reagent codes, especially in the context of devices used in antibiotic susceptibility testing of micro-organisms.

BACKGROUND TO THE INVENTION

For many years, antibiotic susceptibility testing ("AST") has been used as a means for identifying part-particular groups or species of micro-organisms, or for identifying an antibiotic type or dose level most appropriate for dealing with a clinical infection. An internationally recognised standard procedure has been evolved using carrier devices, usually in the form of membrane disks, impregnated with known amounts of specific antibiotics. These disks are used in conjunction with Petri-dish plates containing a layer of growth medium, such as agar gel, to which material containing micro-organisms is applied. An arrangement of individual disks containing different amounts or types of antibiotics are placed on the gel surface at spaced intervals. Usually 6 or 8 disk are placed a circular array on the Petri-dish. The disks are normally of paper or other porous sheet material. The antibiotic diffuses out of each disk into the surrounding growth medium and establishes a radial concentration gradient around the disk. The relative susceptibility of the micro-organisms to the antibiotic is revealed by the diameter of the zone surrounding the disk within which growth of the micro organisms is inhibited. The detailed morphology of the zone can be indicative of the species or genus of micro-organism present. Visual interpretation of the results therefore requires considerable experience and skill, especially if adjacent zones of inhibition are large enough to overlap.

AST is applied on a very large scale worldwide, especially in clinical laboratories. In order to speed up and simplify the reading of such tests, various proposals have been made including the evaluation of the results using image analysis equipment, for example comprising a video camera linked to electronic information processing means such as a microprocessor. Reading systems of this type are available commercially. However, even with the equipment available today, there is still need for considerable skilled human input.

Because each culture plate will normally carry quite a number of disks each of which may be impregnated with a different amount of antibiotic, or indeed possibly an antibiotic different from that on other disks on the plate, it is absolutely essential that the identity of each disk is precisely determined. In accordance with a WHO-recommended standard, each disk bears a printed code which identifies the specific antibiotic on the disk and also its concentration. This code comprises a combination of letters and numerals which can be read easily by the human eye. The presently available "automated" imaging systems require that the operator reads the code on each disk by eye, and enters this information manually into the electronic processor, for example by means of a keyboard. Although optical character readers exist which can convert printed letters and numerals into electronic information, the printed characters must be aligned properly with the reading equipment if the optical character reader is to recognise the individual characters correctly. The disks used in AST are usually applied to the plates by means of mechanical applicators which release individual disks from an array of magazines, each holding a stack of identical disks. No attempt is made to control the orientation of the codes on the disks that drop from the applicator onto the plate surface. The disks are normally found on the plate with their printed codes orientated in a thoroughly random manner.

GENERAL DESCRIPTION OF THE INVENTION

By the invention we provide an improved image analysis system for use in AST and comparable testing methods in which each disk carries, in addition to the reagent code, a means by which the image analyser can determine the orientation of the code relative to an optimal reading direction for that code. In effect, the code or its image is brought into canonical alignment relative to the means provided for reading the code. For example, each disk can be printed with a simple continuous line, arranged for example parallel to the optimal reading direction of the code. The simple line can be recognised by the image analyser, and the electronic processor can be programmed to adjust the actual reading direction to be in accordance with a pre-determined direction relative to the observed line, e.g. parallel to the observed line and hence in the optimal direction for accurate character reading of the code. Individual disks in the array can be read in succession, with the reading direction being adjusted as appropriate. The fact that the codes on the individual disks may be arranged in a random manner both in relation to the initial reading direction and in relation to each other is rendered immaterial by the ability of the reading equipment to match the reading direction to the appropriate direction for each individual disk.

In one embodiment, the invention provides a readable information-bearing device, for example a testing device comprising a reagent-bearing carrier, e.g. an AST disk, which device incorporates orientation means by which an image analyser can determine the optimal reading direction of the readable information on the device.

Preferably, the orientation means comprises an arrangement of information presented on the device surface, in addition to one or more characters indicative of any reagent present in the disk ('reagent code'). For example, the orientation means can comprise linearly-arranged information. Conveniently, this linearly-arranged information is parallel to the optimal reading direction of the reagent code. An example of a very suitable form of linearly-arranged information is a printed line. Discontinuous, or multiple, lines can be used if desired. Alternatively, the orientation means can comprise one or more recognisable features, for example two diametrically-opposed indentations in the circumference of the disk, defining between them an axis from which the reading means can determine the correct reading orientation for the disk code. In order that the reading means can correctly distinguish whether the code is upside-down, even though correctly aligned, the orientation means can for example be off-set relative to the reading direction in a way that enables the reading means to determine which way up the code should be. For example, the orientation means can be a printed line below the code, ie. an "underline". Thus, desirably, the line or other orientation means is off-set from the centre of the disk so that the disk cannot be inadvertantly "read" upside-down.

An important embodiment of the invention is an AST disk bearing a printed multi-character code and incorporating orientation means whereby code-reading means can determine the orientation of the multi-character code and can adjust as required the orientation of either the printed code or of an image thereof to bring the perceived orientation into alignment with that necessary for proper reading of the multi-character code. Preferably, said reading means comprises camera means and image analysis means.

Preferably said orientation means comrises an underline printed beneath the multi-character code.

Another embodiment of the invention is an image analysis system for interpreting AST plates, comprising:
support means for supporting an AST plate;
camera means for imaging a plate supported by said supporting means; and
electronic information processing means, preferably a neural net, linked to said camera means, programmed or trained to:
locate an AST disk on said plate;
identify an orientation means on the located disk, and rotate the perceived image of the located disk as required so that the perceived image of a multi-character code printed on the disk is brought into alignment with a proper reading direction for the code; and
read the code.

Desirably, the image analysis system additionally determines a visible characteristic, such as the diameter, of the zone of inhibition (if any) surrounding the disk, and associates this characteristic with the code. This determination can be performed prior to, during, or after code reading.

Preferably, the electronic information processing means includes or is linked to an 'expert system' comprising a database of AST characteristics of known micro-organisms. This can include a number of "expert rules" for interpreting the perceived image of the zone of inhibition.

The invention therefore provides an AST reading system or the like having the capability automatically to read the reagent code, relate this code to a specific reagent/concentration, and link this information to a set of "expert rules" and a database. No commercially-available reading system has this capability.

It may not be necessary for the reading system to read the code on every disk on the plate. Because most test procedures are very repetitive and standardised, the system can be pre-programmed to expect certain combinations of disk codes on a plate, for example a routine sequence of disks arranged around the plate circumference. When the system has identified the codes on some eg. on two, of the disks, this may be sufficient for the system to match the arrangement with an expected disk array and therefore deduce from its memory the reagent identity on the remaining "unread" disks on the plate. If necessary, the operator can input this information into the reading system when the disks are applied to a batch of plates, or when a disk dispenser is loaded with disks ready for use.

An example of important zone morphology is beta-lactamase activity, which manifests itself visibly by the growth of spots or mini-colonies of micro-organisms within the zone.

It is convenient if the analysis system includes display means for displaying the disk image.

Adjustment of the reading direction can be achieved readily by, for example, presenting the plate on a rotatable support or holder to the reading means, so that the axis of rotation of the holder is orthoganol to the reading plane. After identifying the orientation means, the reading means can cause the support or holder to be rotated about this axis, as necessary, until the orientation means is brought into a pre-determined alignment, and the disk code can then be read. Alternatively, the plate can remain in a constant location and the camera or other reading means can be rotated as necessary to bring the code image into correct reading alignment. As a further alternative, both the plate and the reading means can remain constantly located, and the electronic information processor can be programmed or "trained" to rotate the image seen by the reading means until the proper alignment is achieved. It may also be appropriate to rotate either the camera or the plate to bring separate members of a plurality of disks on the plate into view for reading in succession. Alternative geometries can be used to cope with other information arrangements, such as a linear array of reagent-bearing carrier devices, although such arrangements are not currently used as standard practice within the microbiology-related industry.

The invention also provides an image analyser for use in determining the result of susceptibility testing of micro-organisms on a culture medium, comprising:

a) camera means for viewing the culture medium;

b) electronic information processing means, linked to said camera means, programmed or trained to interpret any region of visibly altered micro-organism growth in the vicinity of a susceptibility testing disk present on the culture medium, wherein said processing means is also programmed or trained to read a character code on the disk indicative of the susceptibility reagent in the disk and to interpret orientation means incorporated in or on the disk by which the optimal reading direction of the character code can be recognised, and to adjust as necessary the actual reading direction to bring this into line with the actual orientation of the character code on the disk.

Character code reading is based on pattern recognition. Sophisticated electronic processing equipment, which may utilise neural nets, are now available which can be programmed or trained to cope with the demands imposed by the adjustable reading system of the invention.

If necessary, the character code on the disk can be printed using a font chosen to match the reading capability of the reading means. However, as optical character recognition (OCR) technology advances, the need for a specific font to be used may decrease.

It will be appreciated that although the present-day industry standard involves the use of circular disks as carriers for the antibiotics, this carrier shape is merely incidental as far as the invention is concerned. Other carrier shapes can be chosen if desired.

Expressed more broadly, and useful in a far wider context than the reading of AST disk codes, the invention provides an optical character reader having the capability of adjusting its reading direction to read correctly a combination of characters irrespective of the orientation of the characters when presented to the reader. This will greatly facilitate the OCR reading of documentary information, by avoiding the need for each document to be presented to the reader in a pre-determined orientation. As described above, each document can contain an orientating signal, such as a printed line or lines, from which the OCR reader can determine the optimal reading direction for the document text.

SPECIFIC DESCRIPTION OF A PREFERRED EMBODIMENT

By way of example only, a system for determining the results of antibiotic susceptibility testing is illustrated in the accompanying drawings and is described in detail below.

1. BRIEF DESCRIPTION OF THE DRAWINGS

FIGS. 2a to 2c show the sequence involved in optically reading a character in the code on an AST disk.

FIG. 2a shows a typical image of a character as seen by the camera.

FIG. 2b shows a segmented bit-map of the character.

FIG. 2c shows a binarised vector representing the character. The character is recognised as an "A".

FIGS. 3a to 3c show the stages in correctly orientating the character code by means of an underline.

FIG. 3a shows a "grey" image of the disk.

FIG. 3b shows a binary image of the disk code.

FIG. 3c shows the rotated image of the code.

FIG. 4a shows a "grey" image of the AST plate.

FIG. 4b shows the detected disks binary image.

FIG. 4c shows the inhibition zones binary image.

FIG. 5a shows a typical image of a disk with large overlapping zones of inhibition.

FIG. 5b shows the computer perceived circumferences of the zones after radii have been fitted to the zone images.

Figure 5B:
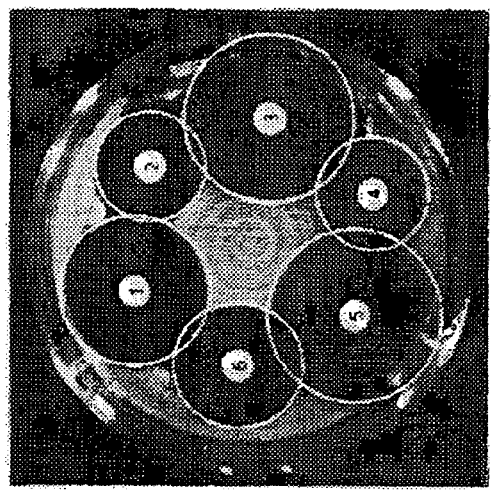
FIGS. 5a and 5b show a typical result of determining the inhibition zone radii in accordance with the invention.
Figure 5A:
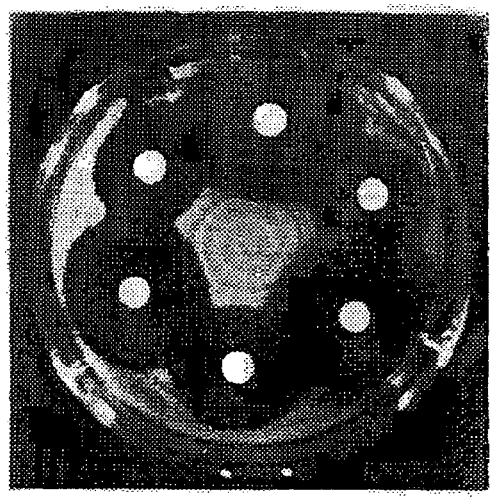
Figure 6A:
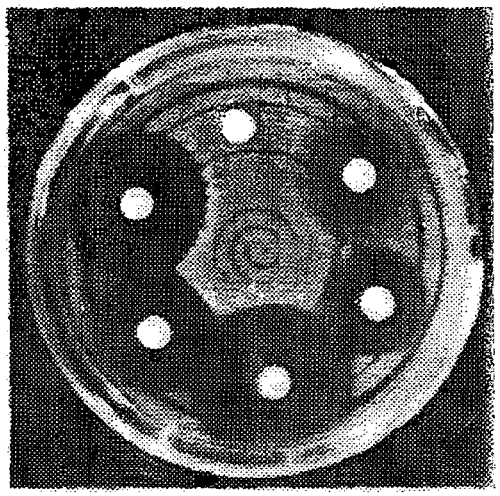
Figure 6B:
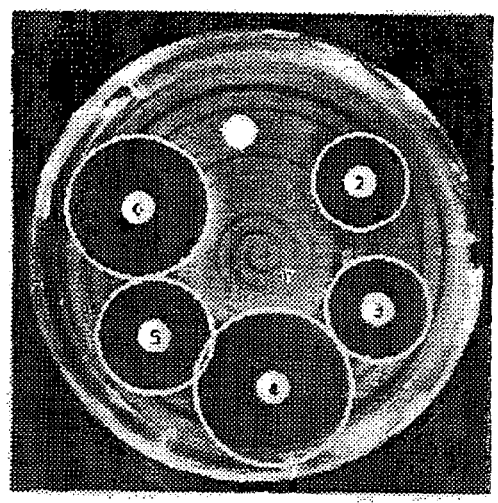
Figure 7A:
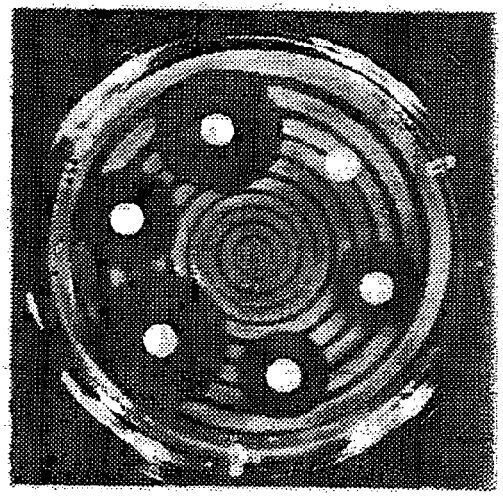
Figure 7B:
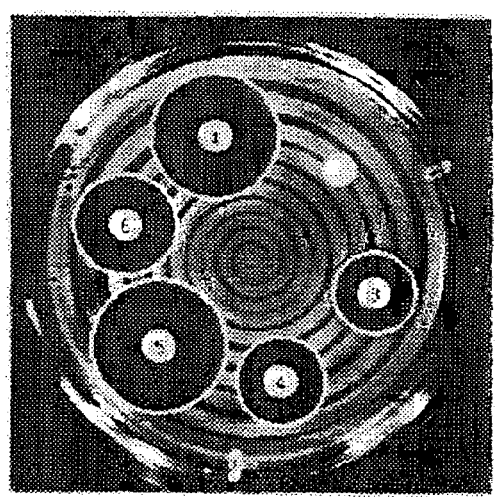

FIGS. 6a/b and 7a/b show the results of other experiments comparable to those shown in FIGS. 5a/b.

Figure 1:
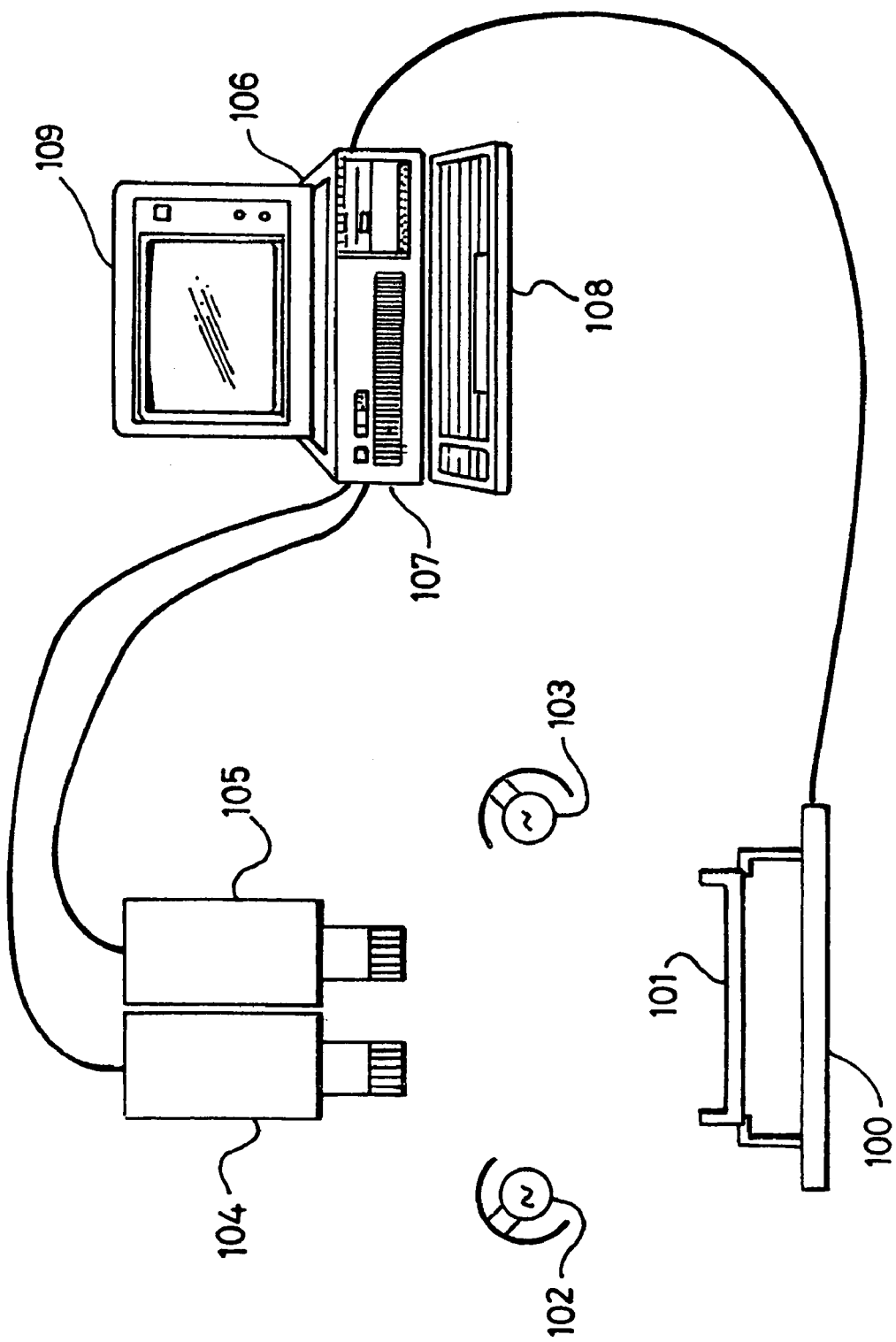
FIG. 1 illustrates the general layout of an AST plate reading system in accordance with the invention.
Figure 4C:
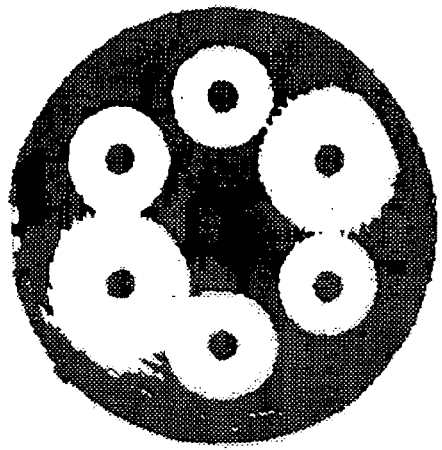
FIGS. 4a to 4c show the sequence involved in locating the position of disks on an AST plate.
Figure 4B:
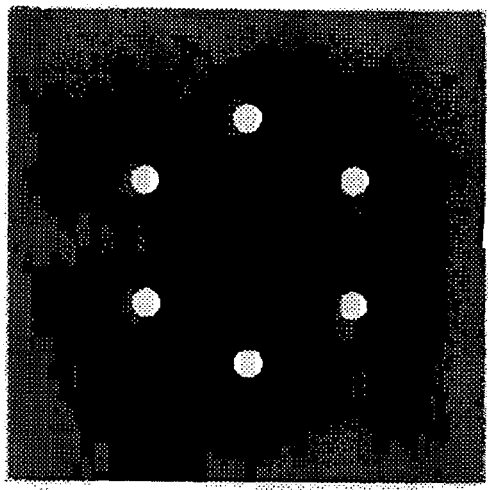
Figure 4A:
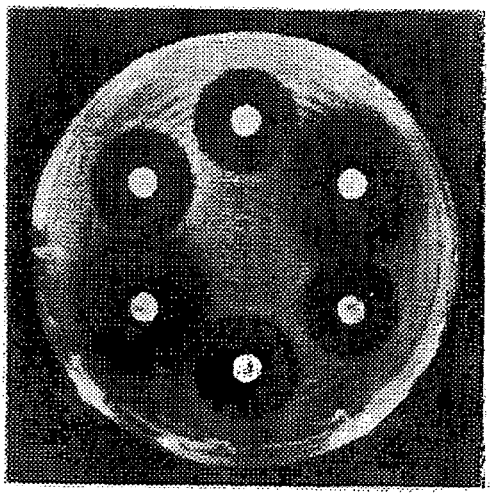

Referring to FIG. 1, the apparatus comprises a computer controlled stage or holder 100 for a Petri dish 101. The Petri dish is illuminated by two light sources 102 and 103 and can be viewed by two cameras, one of which (104) has high magnification and the other (105) has lower magnification. Each camera is linked to an image analysing system 106. As shown this comprises a computer console 107, a keyboard 108 and a visual display unit 109. The holder, light sources and camera equipment will normally be contained within a casing or shroud (not shown).

FIGS. 2 to 7 are referred to at appropriate places in the following detailed description of the reading system of the invention.

2. IMAGE ANALYSIS

2.1 Image Capture

The camera provides an analogue signal that represents the scene being viewed by the camera. This signal is digitised and stored in computer memory as an array of numbers, where each element of the array represents a picture element (pixel), and its value represents the image brightness at that point in the original scene. Typically, black has a value of 0 and pure white a value of 255. Once the image has been captured, it can be treated as computer data and manipulated by computer programs. The image can be displayed on a computer screen by using the pixel values to control the screen brightness and the result resembles the original analogue image.

2.2 Thresholding to Segment an Image

Thresholding is the process where all the pixels with values between two limits are set to maximum white and all others are set to zero. We use thresholding to separate objects (white) from background (black) so that we can measure parameters such as size for each object. It is a very quick process to implement—the problem is to define the limits so that only the features of interest are extracted. In this application, thresholding is used to extract the impregnated disks, the inhibition zones and the character codes. Correct thresholding is critical to the method presented here and requires an algorithm to define the threshold automatically which can tolerate significant variations in image brightness.

2.3 Automatic Threshold Level Determination

The brightness levels required to successfully threshold the various components of AST plate images are affected, for example, by the type of growth medium and bacteria, as well as the level of illumination. For the overall measurement to be automatic, a method of calculating the threshold level from the image is essential. The method implemented is faily robust, providing successful segmentation under a wide range of conditions and without operator intervention.

There are many methods of automatic threshold determination, which can be used for the purposes of the invention. We have chosen a method used is based on that reported by Kittler et al, *Computer Vision*, Vol 30, 125–147 (1985). It assumes that all the pixels in an image can be assigned to one of two groups of objects on the basis of intensity. The object edges in the image should always straddle the boundary between the two regions. By using the edge image as a sampling mask, it is possible to estimate the best mean pixel value that will separate the two regions. Kittler et al showed that this could be done mathematically as follows:

Make the edge image from the input image (E)
Multiply the input image by the edge image (M)
Divide the sum of pixel values of (M) by that of (E) to give the threshold value

3. THE METHOD

The physical layout of the equipment used consisted of two solid-state charge-coupled device (CCD) cameras [Hitachi KPM1] with fixed focal length lenses of 50 mm and 12.5 mm respectively, viewing the plate vertically from above—as seen in FIG. 1.

Each plate was positioned over a rotatable holder with a black light-trap underneath. This helped to maximise the difference between microbial growth and the inhibition zones.

3.1 Finding the Discs

A low magnification image of the AST plate is captured. The plate can be presented at any orientation, so the positions of the antibiotic discs are unknown and the first task is to find them.

The discs are brighter than most parts of the image and the threshold level required to select them is determined using the automatic algorithm. The resulting image contains the discs, but may also contain some artifacts. Since the size of the discs is well known (6 mm diameter), all objects significantly larger or smaller than the discs can be rejected.

The centres of gravity of the discs are measured and checked to ensure that they conform to an expected pattern (for example, octagonal for eight discs) within a predefined tolerance. If the disc positions fail this test, it is possible that a disc has been dislodged and is no longer at the centre of its inhibition zone, or that one of the detected objects is not a disc.

3.2 Finding and Measuring the Inhibition Zones

The inhibition zones are expected to be the darkest part of the image. Automatic thresholding is used again, but with a new threshold level to create an image consisting of the inhibition zones. The resulting image can be very complex since, in addition to the inhibition zones, there may be additional objects created by gaps in the spiral coating or physical damage to the growth medium. Unlike the task of finding the discs, there is no easy way to reject the parts that are not inhibition zones. However, the following method of processing the image works well under a wide range of typical and adverse conditions. In essence, it monitors how well a circle can be fitted within the inhibition zone around each disc as a function of the circle radius, accepting the radius at which the fit criterion changes most rapidly from good to bad.

Consider a circle of radius R, centred on one of the discs, where all the pixels in the 'zones' image that lie directly under the circle are counted, giving the value C; the circle consists of $C_{max}$ pixels. If the circle lies fully within the zone, the value of C should be almost the same as $C_{max}$ and the ratio $C/C_{max}$ should be close to 1. If the circle lies outside the main zone area, C will be relatively small and $C/C_{max}$ will be much less than 1. A non-zero value outside the zone can occur due to intersection with adjacent zones, gaps in the spiral coating, or some other artefact in the zones image. When the radius is such that the circle lies close to the edge of the zone, $C/C_{max}$ will be at some intermediate value, and change rapidly for small changes in radius.

The algorithm consists of measuring the $C/C_{max}$ ratio as a function of radius, making allowance for any parts of the circle which fall outside the limits of the sample plate, then finding the point at which the $C/C_{max}$ ratio decreases most rapidly. This corresponds well with visual placement of the best fit circle.

Tests conducted on a wide range of samples, and over a wide range of illumination conditions, showed that this method produces consistently acceptable results. Failures were rare and inevitably due to poor segmentation of the zones. FIGS. 5*a* and 5*b* show the performance on a sample with high overlap. Another example is seen in FIGS. 6*a/b*.

Table 1 shows the results of testing the reproducibility of the fitted radii, using a random selection of sample plate orientations. The standard deviation is the uncertainty in a single radius value, which is the usual case here. Hence the precision of the method is about ±0.2 mm.

TABLE 1

Reproducibility Tests on Zone Size Measurement

| Disc | Mean Radius (mm) | Standard Deviation | Standard Error |
|---|---|---|---|
| 1 | 16.5 | 0.14 | 0.04 |
| 2 | 8.0 | 0.35 | 0.11 |
| 3 | 15.7 | 0.12 | 0.04 |
| 4 | 19.9 | 0.16 | 0.05 |
| 5 | 20.8 | 0.22 | 0.07 |
| 6 | 11.2 | 0.05 | 0.02 |

3.3 Finding and Reading the Disc Codes

Disks were prepared with the following code characteristics in order to simplify the code recognition task:
  mono-spaced 'sans serif' font: consistent spacing between characters permits checks that can resolve problems caused by broken and incomplete characters. The absence of serifs reduces possible linking of adjacent characters.
  underline bar: this is a small straight line underneath the code characters. It provides an object that defines the orientation of the printed code so that the image can be rotated to a consistent orientation, significantly simplifying the code recognition.

An image of each disc is captured by the high magnification camera because the low magnification image does not provide sufficient resolution to detect the characters. Automatic thresholding is used to extract just the printed codes from the input image. All objects are measured and the underline character found as the object with the greatest length/width ratio. Using the orientation of the underline, the rotation angle is calculated to present the characters in the normal, upright configuration. Rotation of character codes is discussed further below. Checks are made on the individual objects so that the parts of a fragmented character are correctly grouped together. A 32×32 pixel region around each potential character is reduced to 16×16 pixels and passed to the neural net module for interpretation.

The neural net module returns a three character list, giving the three closest characters to the supplied pattern. Data is also returned that estimate the confidence in the matching process. The returned character matches for each detected object are used to construct the total code for the disc under examination. Using the confidence data and the three possibilities for each character, a list of possible codes are generated and checked against a database of valid codes. This allows the automated process to recover from minor errors, perhaps caused by poor character definition, yet flag significant errors.

3.4 Rotating Character Code Images

The underline is used to calculate the orientation of the character codes, and thereby the rotation angle to achieve normal, upright orientation. The orientation of the underline gives two solutions which are 180° apart, the correct one is established by calculating where the character objects are, relative to the underline. It is possible for the underline to become fractured if the print quality is poor, or the threshold level badly set. When this happens, the largest fragment may still be sufficiently large to register as the underline. If it does not, one of the character objects will be chosen instead and the rotation angle will be erroneous. Checks on the character object positions will reveal the error and further processing avoided.

The underline character, and its components if fractured, must not be treated as though they are character objects. This is achieved by removing all objects co-linear with the underline character (within a set tolerance).

In order to interpret the codes as printed, it is essential to determine which row each character comes from; they are assigned to either the upper or lower row by comparing individual centres of gravity with the mean of all characters.

As with the underline character, it is possible to get fragmented or broken character objects, and it is not wise to reject any objects on the basis of size. All potential character objects are compared with each other to determine if any overlap horizontally, or are narrower than the expected width (approx 32 pixels). If fragmentation is detected, the fragments can usually be grouped unambiguously and treated as a single character object. This gives the neural net the best possible input and improves the chances of correct interpretation.

FIGS. 3*a*, 3*b* and 3*c* show examples of the grey level starting image, thresholded code with underline, and the final rotated code image.

4. NEURAL NETWORKS FOR OPTICAL CHARACTER RECOGNITION

An artificial neural net is used to recognise the characters on the susceptibility disc. Of crucial importance is the level of confidence in the character recognition.

4.1 Artificial Neural Nets and Pattern Recognition

The task of recognising a character is essentially a pattern recognition task (FIGS. 2a–2c). Each letter in the image of a susceptibility disk is isolated, centered and rotated to an approximately upright position. This image is stored as a sequence of 0's and 1's, and due to noise, any particular letter will have a large number of different sequences. The task of pattern recognition is to find an algorithm, which given a new pattern, or sequence of 0's and 1's, will determine which letter it most closely matches.

An Artificial Neural Net is a computing algorithm that is based on the function and architecture of the brain, with many highly interconnected but small processing units. It is well suited to pattern recognition.

Learned Vector Quantisation, or LVQ, is reported in T. Kohonen, *Self-Organisation and Associative Memory*, Springer-Verlag, 1984. Each example pattern can be thought of as a point in a high dimension vector space. LVQ operates by creating one (or more) representatives for each character. During training, each representative is moved to a position so that each character is nearer to its representative than to the representative for a different character. During runtime operation, each new pattern that is presented to the LVQ is classified according to which representative it is nearest to.

The neural net was "trained" by giving it example patterns and adapting the weights iteratively. 100 example patterns for each letter and number were generated from a print out on dry specimen card. These 3600 samples (36 letters+numbers×100 examples) were split into two halves, with 50 example patterns of each character. The neural net was trained on the first 1800, that is it "learnt" how to recognise the letters and numbers in these examples. As a test, the neural net was then presented with the other 1800 examples.

4.2 Neural Net Performance on Real Plate Images

The images of characters used for training and testing the Neural Net were captured from specimen card printed with example antimicrobial agent codes. In comparison, the print quality expected on typical discs in real use will be degraded by:

(a) impregnation with antimicrobial agent and subsequent drying.

(b) exposure to the culture medium during the susceptibility test.

It was essential to assess the effect of this degradation on neural net performance by processing images of discs that had been used in 'real' susceptibility tests. The samples used for these tests were limited in number and in range of characters, consisting of 7 examples of the 5 codes FR100, RD2, CAZ30, MEZ30 and N10, a total of 147 characters.

The neural net recognised 146 correctly. It failed on one example of MEZ30 where the first, second and third best guesses for the character "0" (zero) were 8,0 and 6 respectively. All were classified as 'possible', indicating a noisy image. Using these three guesses, the complete code could have been MEZ38, MEZ30 or MEZ36, but comparison with the valid code list eliminates the first and third, leaving MEZ30 as the correct answer.

The invention claimed is:

1. A carrier device for use in an antibiotic susceptibility test ("AST"), the device releasably carrying an antibiotic related to the test, and bearing machine readable information concerning the antibiotic, wherein the device also includes orientation means for enabling an image analyzer to determine an optimal reading direction of the readable information, the device is an AST disk, the machine readable information comprises a code comprising one or more letters and one or more numerals and wherein the orientation means comprises means other than said code.

2. A device according to claim 1, in which the orientation means is separate from said machine readable information.

3. A device according to claim 1, in which the orientation means comprises an arrangement of information presented on the device surface, in addition to the code.

4. A device according to claim 1, in which said orientation means comprises linearly-arranged information.

5. A device according to claim 4, wherein said linearly-arranged information is a printed line or lines, printed below or above code.

6. A device according to claim 5, wherein said orientation means comprises an underline printed beneath the code.

7. A device according to claim 1, in which said code identifies said substance and/or its concentration.

8. An image analysis system for interpreting AST plates, each of which holds a plurality of devices each in accordance with claim 1, the system comprising:
   support means for supporting an AST plate;
   camera means for imaging a plate supported by said support means; and
   electronic information processing means, linked to said camera means, programmed or trained to
   locate an AST disk on said plate from among the plurality of AST disks,
   identify orientation means on the located disks,
   and rotate the perceived image of the located disks as required so that the perceived image of a multi-character code printed on the device is brought into alignment with a proper reading direction for the code, and read the code.

9. An image analysis system according to claim 8, which additionally determines the size of the zone of inhibition, if any, surrounding an AST disk.

10. An analysis system according to claim 9, wherein the electronic information processing means includes or is linked to an expert system comprising a database of AST characteristics of known micro-organisms.

11. An analysis system according to claim 9 including display means for displaying an AST disk image.

12. An analysis system according to claim 9 wherein the diameter of the zone of inhibition is determined.

13. An analysis system according to claim 9 wherein the system is programmed or trained to identify orientation means which comprises an underline printed beneath the multi-character code.

14. An image analyzer for use in determining the result of antibiotic susceptibility testing of micro-organisms on a culture medium, comprising:
   a) camera means for viewing the culture medium;
   b) electronic information processing means, linked to said camera means, programmed or trained to interpret any region of visibly altered micro-organism growth in the vicinity of a susceptibility testing device, comprising an AST disk according to claim 1 present on the culture medium, wherein said processing means is also programmed or trained to read said code on the disk indicative of the susceptibility reagent in the device and to interpret orientation means incorporated in or on the disk by which the optimal reading direction of the code can be recognized, and to adjust as necessary the actual reading direction to bring the actual reading direction into line with the actual orientation of the character code on the device.

15. A carrier device for use in an antibiotic susceptibility test ("AST"), the device releasably carrying an antibiotic related to the test, and bearing machine readable information concerning the antibiotic, wherein the device also includes orientation means for enabling an image analyzer to determine an optimal reading direction of the readable information, the device is an AST disk, the machine readable information comprises a code comprising one or more letters and one or more numerals and wherein the orientation means comprises means other than said code, the following clause, in which said orientation means comprises linearly-arranged information, A carrier device for use in an antibiotic susceptibility test ("AST"), the device releasably carrying an antibiotic related to the test, and bearing machine readable information concerning the antibiotic, wherein the device also includes orientation means for enabling an image analyzer to determine an optimal reading direction of the readable information, wherein said linearly-arranged information is parallel to the optimal reading direction of the readable information.

* * * * *